(12) United States Patent
Smilie

(10) Patent No.: US 7,852,214 B2
(45) Date of Patent: Dec. 14, 2010

(54) READER BOARD ASSEMBLY CIRCUIT, SYSTEM, AND METHOD FOR IDENTIFYING A DIGITAL DEVICE AMONG MULTIPLE DIGITAL DEVICES

(75) Inventor: Robert Jacob Smilie, Concord, NC (US)

(73) Assignee: Marcon Internatonal, Inc., Harrisburg, NC (US)

( * ) Notice: Subject to any disclaimer, the term of this patent is extended or adjusted under 35 U.S.C. 154(b) by 353 days.

(21) Appl. No.: 12/027,451

(22) Filed: Feb. 7, 2008

(65) Prior Publication Data

US 2009/0204741 A1   Aug. 13, 2009

(51) Int. Cl.
*G08B 13/14* (2006.01)
(52) U.S. Cl. ............. 340/568.1; 340/426.2; 340/426.25
(58) Field of Classification Search ............... 340/568.1, 340/426.2, 426.21, 426.22, 426.35, 426.14, 340/426.25
See application file for complete search history.

(56) References Cited

U.S. PATENT DOCUMENTS

| | | | |
|---|---|---|---|
| 6,539,400 B1* | 3/2003 | Bloomfield et al. ................. 1/1 |
| 6,693,538 B2 | 2/2004 | Maloney | |
| 2002/0028704 A1* | 3/2002 | Bloomfield et al. ............. 463/1 |
| 2003/0075597 A1* | 4/2003 | Mackay et al. ............... 235/379 |
| 2004/0247080 A1* | 12/2004 | Feda ........................... 378/101 |
| 2005/0111443 A1* | 5/2005 | Herbert ....................... 370/360 |
| 2005/0193059 A1* | 9/2005 | Dellacona ................... 709/203 |
| 2005/0280543 A1 | 12/2005 | Herbert | |

* cited by examiner

*Primary Examiner*—Daniel Previl
(74) *Attorney, Agent, or Firm*—Clements Bernard PLLC; Christopher L. Bernard; Lawrence A. Baratta, Jr.

(57) ABSTRACT

The present invention provides an electronic circuit for detecting, identifying, and/or activating a digital device, including a touch-and-hold connector configured to hold an object of interest, the digital device coupled to the touch-and-hold connector, for example, wherein the digital device has a unique digital registration number, a microcontroller that reads the unique digital registration number of the digital device, a storage receptacle configured to selectively receive the touch-and-hold connector, a light-emitting source coupled to the storage receptacle and associated with the touch-and-hold connector, and an electrical power source.

26 Claims, 1 Drawing Sheet

READER BOARD ASSEMBLY CIRCUIT, SYSTEM, AND METHOD FOR IDENTIFYING A DIGITAL DEVICE AMONG MULTIPLE DIGITAL DEVICES

FIELD OF THE INVENTION

The present invention relates generally to a reader board assembly circuit, system, and method for identifying a digital device, and more particularly to a reader board assembly circuit, system, and method that enables a microcontroller or microprocessor to identify a digital device among multiple digital devices on a serial data bus, and designating this location via a light emitting source, for example. The reader board assembly circuit, system, and method of the present invention finds applicability to key control and management systems, as well as to a plurality of other systems.

BACKGROUND OF THE INVENTION

There are a number of conventional circuit designs for the detection, identification, and/or activation of digital devices that have unique digital registration numbers. One such digital device is an IButton® microprocessor (Dallas Semiconductor), which may contain a memory, a real-time clock, a transaction counter, a temperature sensor, and/or the like. The microprocessor is typically connected via a one-wire interface that is a serial data bus. In order to utilize, troubleshoot, and repair these circuit designs, the prior art discloses using a switching network to identify the location of a specific digital device.

What is still needed in the art, however, is a system that consists of discreet modular units that may be added or subtracted as needed, as well as a means for querying a circuit to detect, identify, and/or activate a specific module.

U.S. Pat. No. 6,693,538 (issued to Maloney on Feb. 17, 2004) discloses one specific application of the digital devices described above. Object carriers are provided for use with an object tracking and control system of a type having a storage receptacle with a tray provided with an array of slots for receiving identification (ID) tags bearing touch memory devices. A computer-based controller is provided for detecting the absence or presence and identity of ID tags disposed in the slots. The carrier includes a container with an openable panel for placing objects in and removing objects from the carrier. A thin plastic tongue projects from the carrier and bears a touch memory device. Carriers bearing objects to be tracked are placed in the storage receptacle with their tongues extending into the slots of the receptacle. The controller thus detects and logs the removal and replacement of the carrier in the storage receptacle. In one embodiment, the opening and closing of the carrier when it is not stored in the receptacle is detected and logged for tracking access to the carrier in more detail. In general, each of the carriers includes an internal addressable switch having one or more input/output (I/O) ports; an on-board sensor, such as a loop-detector sensor for detecting when an object is removed from the carrier, a reed switch for detecting the opening of the carrier, or another type of sensor depending on the intended use of the system; and a light-emitting diode (LED) attached to the carrier.

What is still needed in the art, however, is a system that is simpler, omitting the internal addressable switch and the one or more I/O ports, and associating the LEDs with the storage receptacle, as opposed to the carriers.

BRIEF SUMMARY OF THE INVENTION

In various exemplary embodiments, the present invention provides an electronic detection, identification, and/or activation system that may be used to selectively enable a microcontroller or microprocessor to detect and identify, in order, a specific digital device among multiple digital devices. As described above, typical of such a digital device is an IButton® microprocessor, which belongs to a generic group of microprocessors that are typically disposed within a protective stainless steel can or the like. Each digital device has a unique digital registration number, and comprises an element of a module. The module also includes a microcontroller, a light-emitting source, and is connected to both a host controller (i.e. another microprocessor) and an electrical power source. The microcontroller and the digital device are in electrical communication with a serial data bus. The light-emitting source provides an identifying position signal for the digital device when activated. Typically, the light-emitting source is a light-emitting diode (LED) or the like, and it is flashed on-and-off, for example. The electrical power source may be auxiliary or, if adequate, drawn directly off the serial data bus. The overall system includes a plurality of modules.

According to one exemplary embodiment of the present invention, the electronic detection, identification, and/or activation system includes a touch-and-hold connector configured to hold an object of interest, a digital device coupled to the touch-and-hold connector, wherein the digital device has a unique digital registration number, a microcontroller that reads the unique digital registration number of the digital device, a storage receptacle configured to selectively receive the touch-and-hold connector, a light-emitting source coupled to the storage receptacle and associated with the touch-and-hold connector, and an electrical power source.

According to another exemplary embodiment of the present invention, electronic detection, identification, and/or activation system includes a microprocessor, or host controller, in electrical communication with each of the microcontrollers, and, optionally, a computer coupled to the microprocessor.

According to yet another exemplary embodiment of the present invention, the electronic detection, identification, and/or activation system includes the digital device disposed within a protective housing.

According to yet another exemplary embodiment of the present invention, the electronic detection, identification, and/or activation system includes a light-emitting diode (LED) associated with the touch-and-hold connector.

According to yet another exemplary embodiment of the present invention, the electronic detection, identification, and/or activation system includes the digital device in electrical communication with a serial data bus.

According to yet another exemplary embodiment of the present invention, the electronic detection, identification, and/or activation system includes a light-emitting source that provides an identifying position signal indicating when the touch-and-hold connector is the one receiving or not receiving a digital device or multiple digital devices of interest.

According to yet another exemplary embodiment of the present invention, the electronic detection, identification, and/or activation system further includes a microprocessor, or host controller, operable for selectively illuminating the light-emitting source.

According to yet another exemplary embodiment of the present invention, a reader board assembly system for identifying a digital device among multiple digital devices includes a plurality of touch-and-hold connectors each configured to hold an object of interest, an Ibutton® digital device selectively coupled to each touch-and-hold connector, wherein each digital device has a unique digital registration number, a plurality of microcontrollers each identifying a single Ibutton® among multiple digital devices, a plurality of storage receptacles each configured to selectively receive one of the touch-and-hold connectors, at least one light-emitting source, an electrical power source, and a host controller for sending commands to each of the microcontrollers.

According to yet another exemplary embodiment of the present invention, an electronic detection, identification, and/or activation method includes providing a touch-and-hold connector configured to hold an object of interest, selectively providing a digital device coupled to the touch-and-hold connector, wherein the digital device has a unique digital registration number, providing a storage receptacle configured to selectively receive the touch-and-hold connector, providing a light-emitting source coupled to the storage receptacle and associated with the touch-and-hold connector, providing an electrical power source, providing a reader board assembly circuit connected to a host controller, sending commands from the host controller to the reader board assembly circuit to reset, sending commands to the reader board assembly circuit to learn all of the registration numbers of the digital devices present, and sending commands from the host controller to a reader board assembly circuit to activate and deactivate the light-emitting source.

According to yet another exemplary embodiment of the present invention, the electronic detection, identification, and/or activation method includes sending a learn command to the reader board assembly circuit and the reader board assembly circuit utilizing a Carrier Detect Multiple Access with Bit Arbitration (CDMA-BA) protocol to "fight" for a spot on the serial data bus.

According to yet another exemplary embodiment of the present invention, the electronic detection, identification, and/or activation method includes transmitting a first bit of the registration number on the serial data bus.

According to yet another exemplary embodiment of the present invention, the electronic detection, identification, and/or activation method includes detecting which logic that the serial data bus is currently learning.

According to yet another exemplary embodiment of the present invention, the electronic detection, identification, and/or activation method includes ceasing the transmittal of the digital registration number of the reader board assembly circuit when the logic placed upon the serial data bus is different that the current logic of the serial bus.

According to yet another exemplary embodiment of the present invention, the electronic detection, identification, and/or activation method includes transmitting all bits in the digital registration number for completing an ordered list of registration numbers from the lowers number to the highest number contained in the host's memory.

BRIEF DESCRIPTION OF DRAWINGS

The present invention is illustrated and described herein with reference to various drawings, in which like reference numbers are used to denote like system components and/or method steps, and in which.

DETAILED DESCRIPTION OF THE INVENTION

Figure 1:
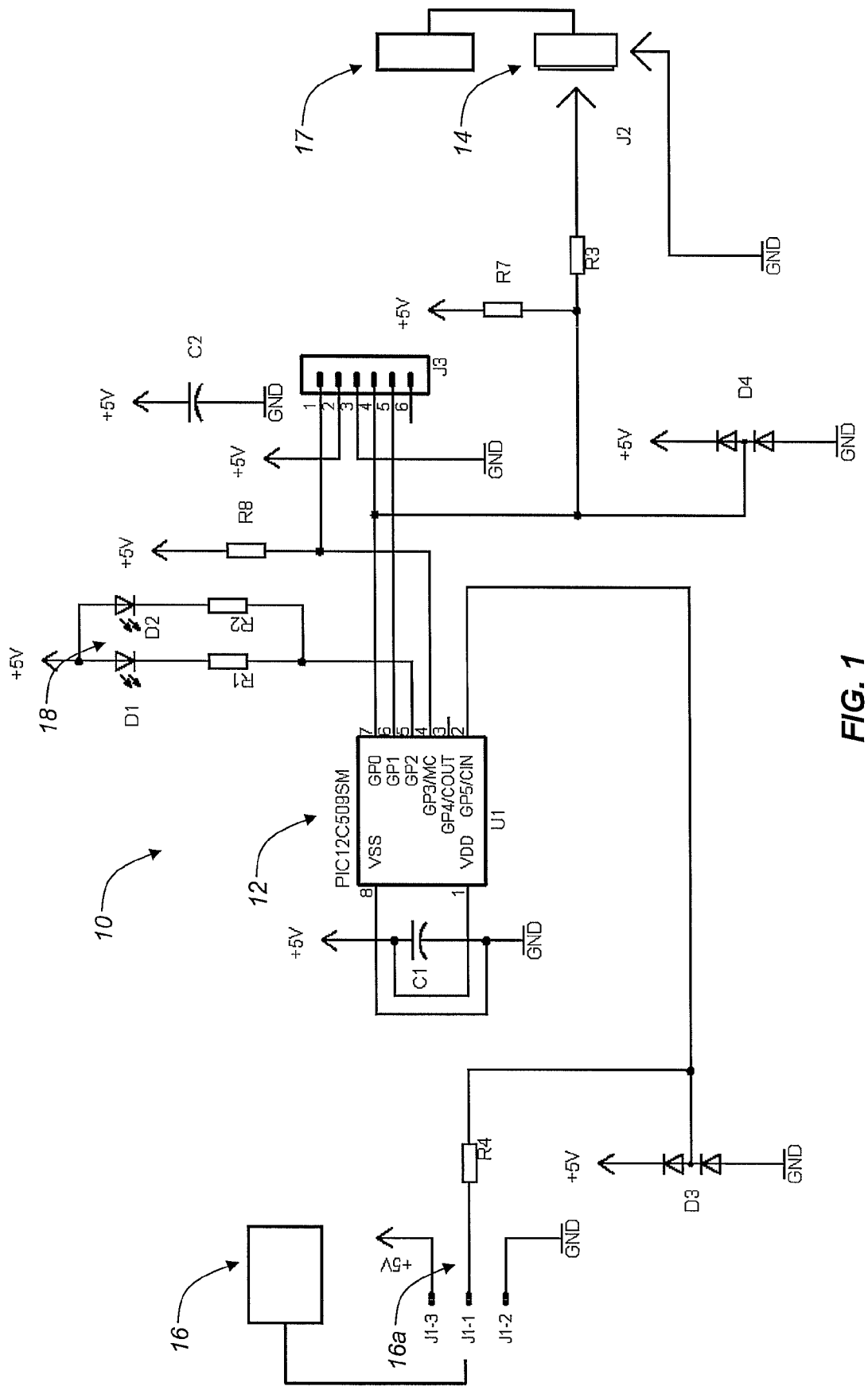
FIG. 1 is an electronic circuit diagram illustrating, in one exemplary embodiment of the present invention, how a module having a digital device detects, identifies, and/or activates that digital device using a microcontroller, a host controller, and a serial data bus.

Referring now specifically to the drawings, the reader board assembly (RBA) circuit 10 of the present invention is illustrated in FIG. 1. As illustrated, the RBA circuit 10 includes a microcontroller 12 or microprocessor, a touch-and-hold connector 14 or the like, a host controller 16, a host controller connector 16a, and a digital device 17 with a unique digital registration number. This digital device 17 is selectively coupled to the touch-and-hold connector 14 or the like, coupling the digital device 17 to the RBA circuit 10. It will be readily apparent to those of ordinary skill in the art that the digital device 17 may also be permanently or otherwise coupled to the RBA circuit 10. In general, the RBA circuit 10 enables asynchronous communications between the digital device 17, via the touch-and-hold connector 14 or the like, and the microcontroller 12. The information received and buffered by the microcontroller 12 is eventually communicated to the host controller 16 and, optionally, a personal computer (not illustrated) or the like. The RBA circuit 10 allows the host controller 16 to identify, locate, and/or activate a specific digital device 17 among multiple digital devices 17 via its unique digital registration number, or to detect the absence of a specific digital device 17 among multiple digital devices 17 via its unique digital registration number, as is described in greater detail herein below.

The RBA circuit 10 essentially forms one of a plurality of modules disposed on a board and within a case having a strikable door, for example, in the case of a key control and management system. A module is a serial data bus detection and identification circuit that enables the microcontroller 12 to detect, identify, and/or activate a specific digital device 17 associated with the module among multiple modules having multiple digital devices 17, all connected to the same serial data bus, for example. Furthermore, the RBA circuit 10 enables a user to easily identify and locate the specific digital device 17, as the location preferably has an associated light-emitting source 18, such as a light-emitting diode (LED) or the like, that is selectively activated by the host controller 16/RBA circuit 10 once the specific digital device 17 has been detected, identified, and/or activated.

In general, the digital device 17 may be an IButton® microprocessor (Dallas Semiconductor) or any other suitable digital device that has a unique digital registration number. The IButton® is a microprocessor that is enclosed in a 16 mm stainless steel can or the like. Because of this unique and durable stainless steel can, the IButton® may be mounted virtually anywhere because it is rugged enough to withstand harsh environments, indoors or outdoors. Thus, the digital device is durable enough to attach to a key fob, ring, or other personal item, and may be used daily for applications, such as access control for vehicles, buildings, computers, etc. The touch-and-hold 14 may be an IButton® receptacle or the like.

In one exemplary embodiment of the RBA circuit 10, as illustrated in FIG. 1, the microcontroller 12 utilizes a firmware-based implementation of the serial data bus protocol.

Each digital device 17 has a distinct and identifiable digital registration number, which essentially becomes the digital registration number of the associated microcontroller 12 once the learning process has taken place. Since each digital device 17 has a different digital registration number, a specific digital device 17 may be detected, identified, and/or activated among multiple digital devices 17. Likewise, the absence of a specific digital device 17 may be detected and identified. Only the digital registration number of a digital device 17 needs to be known to detect and identify the absence of a sought after digital device among a plurality of digital devices. This is accomplished via the use of the microcontroller 12 and host controller 16. The microcontroller 12 is able to read the digital registration number of any digital device 17 that is placed in the touch-and-hold connector 14 or the like. The microcontroller 12 utilizes the serial data bus protocols in its firmware to detect and identify the specific digital device 17. The digital registration number of the specific digital device 17 is used by the RBA circuit 10 to identify it on the serial data bus, such that it can be individually addressed by the host controller 16 from the plurality of modules located on the serial data bus.

The digital registration numbers of the RBA circuit 10 are learned through an algorithm utilizing a Carrier Detect Multiple Access with Bit Arbitration (CDMA/BA) protocol. The CDMA/BA protocol is utilized to find/learn the digital devices 17, and is designed to allow the RBA circuit 10 to detect whether or not a serial data bus collision has occurred. The CDMA/BA protocol is also designed to allow the RBA circuit 10 to detect if the RBA circuit's digital registration numbers were successfully transmitted.

In operation, the host controller 16 issues a serial data bus reset command to the serial data bus. A learn command is then issued by the host controller 16 to learn all of the RBA circuit's digital registration numbers on the serial bus for the digital devices 17 that are present. In response to this learn command, the modules with an IButton® microprocessor present begin to transmit the first bit of their 64-bit digital registration number on the serial data bus. The modules transmit data in binary 1's and 0's, wherein 1 is a recessive bit and 0 is a dominant bit. If the module begins to transmit its first bit by either placing a binary 1 on the serial data bus, but the RBA circuit 10 detects that the serial data bus is currently a binary 0, the module placing a binary 1 gives up transmitting its respective digital registration number altogether. The modules that placed a binary 1 will not transmit their respective digital registration numbers until the next learn command is issued by the host controller 16 on the serial data bus. The modules that placed a binary 0 will continue to transmit their respective digital registration numbers. This bit-by-bit transmission and arbitration detection continues for the remaining 63 bits until one and only one module with the lowest number has transmitted its complete digital registration number. When this occurs, the completed module flags itself to not participate in any serial data bus commands until the next serial data bus reset command is issued. The result of this learn algorithm is a complete ordered list of all digital registration numbers from the lowest number to the highest number contained in the memory of the host controller 16. Various other commands may also be issued by the host controller.

Once the ordered list of digital registration numbers has been compiled and stored in the memory of the host controller 16, the method of detecting and identifying a specific digital device 17 may begin. The host controller 16 sends a command to each module seeking the specific digital device 17 by the digital registration number. Because the list of digital registration numbers is stored in the memory of the host controller 16 from the lowest digital registration number to the highest digital registration number, this storage arrangement allows the host controller 16 to easily locate the digital registration number within its memory, and send a command to the specific module where the specific digital device 17 is located. Thereafter, the specific digital device 17 may be announced to the user via a flashing or non-flashing light-emitting source 18, such as an LED or the like. The host controller 16 sends a command to the RBA circuit 10 to turn the flashing or non-flashing light-emitting source 18 on and/or off. In addition, the light-emitting source 18 may be employed to indicate the removal of a digital device 17 from the serial data bus.

A data line may be permanently connected to the data side of the digital device connector. The microcontroller 12 is connected to the serial data bus by the RBA circuit 10. The RBA circuit 10 allows for the digital device 17 to be switched in and out of the RBA circuit 10. The ability to switch in a specific digital device 17 requires the host controller 16 to identify the specific digital device 17, as they are able to be removed from and inserted into the RBA circuit 10. The host controller 16 sends specific commands to each module that illuminates the light-emitting source 18. This identifies the identity/location of the specific digital device 17 to the user. The unique digital registration number of the module may be stored in the memory of the host controller 16, and later used to sequentially read in the digital device's unique digital registration number. It should be noted that multiple digital devices 17 may be connected to a one-wire bus and identified by each digital device's unique digital registration number. In addition, the learning process may be periodic (i.e. polling-based) or event-driven.

In an alternative embodiment of the present invention, the RBA circuit 10 may be changed such that the light-emitting source 18 is connected to the serial data bus, as opposed to the VCC connection. This change enables the whole circuit to operate without external power, if the power requirements are met by the serial data bus. Modules may be added directly to the serial data bus, essentially like a plug-and-play component on a personal computer (PC).

As described above, U.S. Pat. No. 6,693,538 discloses one specific application of a digital device. Object carriers are provided for use with an object tracking and control system of a type having a storage receptacle with a tray provided with an array of slots for receiving identification (ID) tags bearing touch memory devices. A computer-based controller is provided for detecting the absence or presence and identity of ID tags disposed in the slots. The carrier includes a container with an openable panel for placing objects in and removing objects from the carrier. A thin plastic tongue projects from the carrier and bears a touch memory device. Carriers bearing objects to be tracked are placed in the storage receptacle with their tongues extending into the slots of the receptacle. The controller can thus detect and log the removal and replacement of the carrier in the storage receptacle. In one embodiment, the opening and closing of the carrier when it is not stored in the receptacle is detected and logged for tracking access to the carrier in more detail. In general, each of the carriers includes an internal-addressable switch having one or more input/output (I/O) ports; an on-board sensor, such as a loop-detector sensor for detecting when an object is removed from the carrier; a reed switch for detecting the opening of the carrier, or another type of sensor depending on the intended use of the system; and an LED attached to the carrier.

The present invention, however, provides a system that is simpler, omitting the internal-addressable switch and the one or more I/O ports, and associating the LEDs with the storage receptacle, as opposed to the carriers. Various data and ground connections are also provided. In effect, the RBA circuit 10 provides a touch-and-hold connector 14 or the like, suitable for engaging a digital device 17 or the like, that has a unique digital registration number. The touch-and-hold connector 14 or the like may be selectively identified, located, and/or activated, preferably in conjunction with the lighting, intermittently or otherwise, providing the location of the plug-in carrier or holder to a user. As described above, the LED or the like is assembled as part of the storage receptacle, as opposed to the plug-in carrier or holder.

Although the present invention has been illustrated and described herein with reference to exemplary embodiments and specific examples thereof, it will be readily apparent to those of ordinary skill in the art that other exemplary embodiments and specific examples may perform similar functions and/or achieve like results. All such equivalent embodiments and examples are within the spirit and scope of the present invention, are contemplated thereby, and are intended to be covered by the following claims.

What is claimed is:

1. An electronic circuit for detecting, identifying, and/or activating a digital device among multiple digital devices, comprising:
    a digital device having a unique digital registration number;
    a microcontroller operable for receiving the unique digital registration number of the digital device and carrying out a bit arbitration algorithm among a plurality of digital devices simultaneously; and
    a host controller coupled to the microcontroller operable for detecting, identifying, and/or activating the digital device based on the unique digital registration number received by the microcontroller.

2. The electronic circuit of claim 1, further comprising a touch-and-hold connector operable for coupling the digital device to the microcontroller.

3. The electronic circuit of claim 2, further comprising a storage receptacle configured to selectively receive the touch-and-hold connector.

4. The electronic circuit of claim 3, further comprising a light-emitting source coupled to the storage receptacle and associated with the touch-and-hold connector.

5. The electronic circuit of claim 1, wherein the digital device comprises a microprocessor.

6. The electronic circuit of claim 5, wherein the digital device comprises a microprocessor disposed within a protective housing.

7. The electronic circuit of claim 1, wherein the digital device is in electrical communication with a serial data bus.

8. The electronic circuit of claim 4, wherein the light-emitting source provides an identifying position signal indicating when the touch-and-hold connector is one of being received by the storage receptacle and not being received by the storage receptacle.

9. The electronic circuit of claim 4, further comprising a microprocessor operable for selectively illuminating the light-emitting source.

10. The electronic circuit of claim 1, wherein the electronic circuit is utilized as part of a key control and management system.

11. A method for detecting, identifying, and/or activating a digital device among multiple digital devices, comprising:
    providing a digital device having a unique digital registration number;
    providing a microcontroller operable for receiving the unique digital registration number of the digital device and carrying out a bit arbitration algorithm among a plurality of digital devices simultaneously; and
    providing a host controller coupled to the microcontroller operable for detecting, identifying, and/or activating the digital device based on the unique digital registration number received by the microcontroller.

12. The method of claim 11, further comprising providing a touch-and-hold connector operable for coupling the digital device to the microcontroller.

13. The method of claim 12, further comprising providing a storage receptacle configured to selectively receive the touch-and-hold connector.

14. The method of claim 13, further comprising providing a light-emitting source coupled to the storage receptacle and associated with the touch-and-hold connector.

15. The method of claim 14, wherein the light-emitting source provides an identifying position signal indicating when the touch-and-hold connector is one of being received by the storage receptacle and not being received by the storage receptacle.

16. The method of claim 14, further comprising providing a microprocessor operable for selectively illuminating the light-emitting source.

17. The method of claim 11, wherein the digital device comprises a microprocessor.

18. The method of claim 17, wherein the digital device comprises a microprocessor disposed within a protective housing.

19. The method of claim 11, wherein the digital device is in electrical communication with a serial data bus.

20. The method of claim 11, wherein the method is utilized as part of a key control and management process.

21. A method for detecting, identifying, and/or activating a digital device among multiple digital devices, comprising:
    providing a holder device configured to hold an object of interest;
    providing a digital device coupled to the holder device, wherein the digital device has a unique digital registration number;
    providing a storage receptacle configured to selectively receive the holder device;
    providing a light-emitting source coupled to the storage receptacle and associated with the holder device;
    providing a host controller;
    providing a microcontroller connected to the host controller;
    sending a command from the host controller to the microcontroller to reset;
    sending a command from the host controller to the microcontroller to learn the unique digital registration number of the digital device and any other digital devices in electrical communication with the microcontroller using a simultaneous bit arbitration algorithm; and
    sending a command from the host controller to the microcontroller to activate/deactivate the light-emitting source.

22. The method of claim 21, further comprising executing the learn command at the microcontroller utilizing a Carrier Detect Multiple Access with Bit Arbitration protocol.

23. The method of claim 21, further comprising transmitting a first bit of the unique digital registration number on a serial data bus.

24. The method of claim 23, further comprising detecting which logic the serial data bus is currently learning.

25. The method of claim 24, further comprising ceasing the transmittal of the unique digital registration number when the logic placed on the serial data bus is different from the current logic of the serial data bus.

26. The method of claim 25, further comprising transmitting all bits in the unique digital registration number for completing an ordered list of unique digital registration numbers from the lowest number to the highest number contained in a memory of the host controller.

* * * * *